(12) United States Patent
Fourman

(10) Patent No.: US 6,421,670 B1
(45) Date of Patent: Jul. 16, 2002

(54) COMPUTER NETWORK

(76) Inventor: Clive M Fourman, 73 Collier Street, London (GB), N1 9BE ( * ) Notice: Subject to any disclaimer, the term of this patent is extended or adjusted under 35 U.S.C. 154(b) by 973 days.

(21) Appl. No.: 08/632,240

(22) Filed: Apr. 15, 1996

(51) Int. Cl.⁷ .............................................. G06F 17/30
(52) U.S. Cl. ........................................................ 707/10
(58) Field of Search ........................................... 707/10

(56) References Cited

U.S. PATENT DOCUMENTS

| | | | | |
|---|---|---|---|---|
| 4,751,635 A | * | 6/1988 | Kret ............................. | 395/610 |
| 5,319,777 A | * | 6/1994 | Perez .......................... | 395/610 |
| 5,423,034 A | * | 6/1995 | Cohen-Levy et al. ........ | 395/610 |
| 5,483,652 A | * | 1/1996 | Sudama et al. .............. | 395/610 |
| 5,495,607 A | * | 2/1996 | Pisello et al. ................ | 395/610 |
| 5,519,861 A | * | 5/1996 | Ryu et al. .................... | 395/601 |
| 5,596,744 A | * | 1/1997 | Dao et al. .................... | 395/610 |
| 5,634,053 A | * | 5/1997 | Noble et al. ................. | 395/604 |
| 5,668,897 A | * | 9/1997 | Stolfo ......................... | 382/283 |
| 5,724,968 A | * | 3/1998 | Iliff ............................. | 600/300 |

* cited by examiner

Primary Examiner—Wayne Amsbury
(74) Attorney, Agent, or Firm—Nixon & Vanderhye P.C.

(57) ABSTRACT

A multidimensional database is read, written to and replicated over a computer network by accessing an ordered list of N-M component keys (where N is the dimensionality of the database and M is an integer greater than one and less than N, each key being associated with an M-dimensional data slice represented by a text string with control characters to define the rows and columns. Each such data slice is individually replicated to update remote replica copies of the database.

24 Claims, 7 Drawing Sheets

EUROPE

USA

| | JAN | FEB | MAR |
|---|---|---|---|
| SALES | 10 | 20 | 30 |
| OVERHEAD | 20 | 30 | 40 |
| PROFIT | 30 | 40 | 50 |

DBA 3,4,6 changed

DBB 1,4,8 changed

Fig. 8C

Exception indicates replication conflict

COMPUTER NETWORK

The present invention relates to a computer database with copies stated on different computers in the network which can be assessed and updated from individual computers an the network.

BACKGROUND OF THE INVENTION

It is knows to replicate a keyed indexed 2-dimensional database over a computer network and i particular to, replicate changes in that database which have been made to different copies.

Replication describes the ability of databases to maintain multiple copies, or replicas, so that if a change is made to one copy of the database it will be replicated to the other copies. Replication can be one-way, meaning that only changes to a master copy will be replicated to the other copies, or two-way, meaning that one or a number of copies may be changed and that changes made will be reflected in all replica copies.

It is known to store data in multidimensional form in order to permit easy retrieval of particular slices of data from a multidimensional data set. Lotus Notes ® is one database programme having the replication feature. However, it is essentially a 2-dimensional database program.

SUMMARY OF THE INVENTION

The invention provides a network of computers having:
i) individual data entry means;
ii) at least one communications link for transferring data entered from a said data entry means to other computers in the network;
iii) a distributed N-dimensional database accessible and updateable by mid computers, N being an integer greater than two, said N-dimensional database comprising:
  a) a Plurality of M-dimensional arrays where in is an integer greater than one and less than N, and
  b) an ordered list of keys, each key being associated with a particular M-dimensional array and having a sting of N-M components which identify the associated M-dimensional army, said sting defining the order of the key in said list;
iv) searching means for finding a desired array in response to entry of said key from a said data entry means;
v) updating means for modifying a found M-dimensional array, and
vi) replicating means for replicating modifications to said modified M-dimensional array am the network.

Preferably M=2.

In one embodiment at least one of said M-dimensional arrays has a hierarchical structure, rows and/or columns at one level in the hierarchy being divided into groups at an adjacent lower level in the hierarchy and the levels in the hierarchy being selectable by individual users.

Preferably, levels in said hierarchical structure below the top level are associated with extra components in the string of the key corresponding to the top level of the hierarchy.

Preferably said replicating means comprises programmes for transmitting modifications to the distributed database over the network at predetermined intervals.

Preferably Sam program means further comprises override means for forcing a replication of modifications to the distributed database in response to entry of a command from a data entry means.

Preferably the network comprises spreadsheet means for performing calculation on the data in said distributed database.

The invention also provides a corresponding method of updating and accessing such a database.

DESCRIPTION OF THE DRAWINGS

A preferred embodiment of the invention is described below by way of example only with reference to FIGS. 1 to 8C of the accompanying drawings wherein:

FIG. 8A ohms two copies of a database respective computers before changes an entered and replicated;

FIG. 8B shows changes made independently on the two computers; and

FIG. 8C shows the replication of such changes.

DETAILED DESCRIPTION OF THE INVENTION

Figure 1:
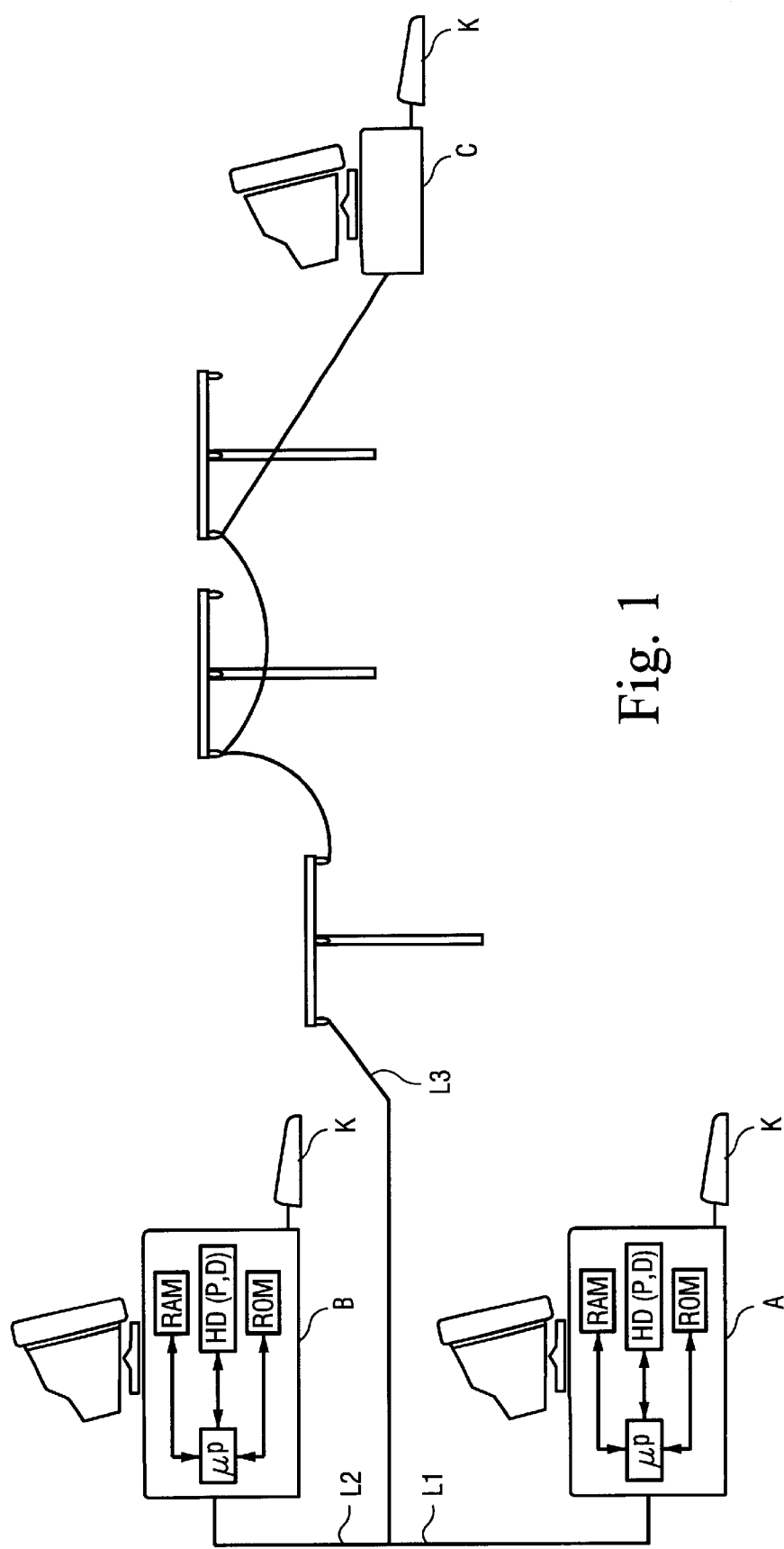
FIG. 1 is a diagram of a computer network in accordance with the invention.

The present invention enables two-way replication of a multi-dimensional (i.e. 3-dimensional or greater) database.

Replication can be achieved at record or field level. The current invention permits both record level and field level replication of multidimensional data.

The invention stores multidimensional data as 2-dimensional data slices, each associated with an (N−2) dimensional key, where N is the number of dimensions in the database.

When the database has more than 3 dimensions, it is harder to visualise, but the principle is the same. The multidimensional database consists of many such slices, each with a unique key. Fast access to the data is provided by indexing the keys associated with each slice to allow rapid retrieval of any slice referred to by its key.

In one implementation of the current invention, each slice of data is stored in a single field as a table of numbers with columns separated by TAB characters and rows separated by Carriage Return characters. In another implementation each of the cells is stored as a separate field.

The current invention uses the search engine of Lotus Notes to retrieve slices of data by key value, but a similar keyed indexed search could be used in any other system. Similarly the current invention uses Lotus Notes replication, but replication in any database could be used. Implementation of the current invention is demonstrated by two software functions, one to retrieve a slice of multidimensional data from a keyed indexed data base stored in Lotus Notes and one to place data into the database.

Retrieval of Data

The function NotesKeyedSelect ("KEY1") retrieves the two dimensional slice of data associated with the key "KEY1". If the value of KEY1 is North;Manufacturing, then the data returned is the two dimensional slice of data relating to North and Manufacturing. This function can be used to retrieve data slices or comments. When then is more and one comment relating to a key, each of the comments is returned by a carriage return.

The source code to implement this function using the Lotus Notes 3.0 API for Microsoft Windows is provided in Appendix 1.

The function NotesKeyedInsert has "KEY1") places a two dimensional slice of data "Slice" in a document with the key "KEY1". If the slice already exists and its value has changed, it will be replaced. This function is used to store data where there is only one table of data associated with a key value.

The function NotesKeyedUniqueInsert ("Slice" "KEY1") places a two dimensional slice of "Slice" in a document with the key "KEY1". Even if the slice already exists a new document is added with the same key. This function is used to store comments where there may be more than one comment associated with a key value.

The source code to implement this function using the Lotus Notes 3.0 API for Microsoft Windows is provided in Appendix 1.

It is a further enhancement that if a document with a particular key already exists, data to be replaced is checked to see if it has changed and updated if it has changed. This smart update ensures that only slices which have actually changed will be modified and replicated. Without this enhancement, slices may be replicated unnecessarily causing additional replication time and communication cost.

It is a further purpose of this invention to allow textual comments relating to multidimensional data to be stored, replicated and shared. The retrieval of stored comments is demonstrated by the function NotesKeyedSelect where, if multiple documents am stored against an individual key, then the text in the data field of then shows is concatenated to give a list of comments.

It is a further purpose of The current invention to allow multiple textual comments to be stored in the database and associated with a particular slice of data.

Comments are added in the same way as data slices themselves are added to the database except that when a comment is added, it does not replace any existing document with the specified key, but is added is addition. To avoid confusion, in using the current invention to store comments associated with data, the key used for comments is prefixed or suffixed by the text "COMMENT". For example, comments on the slice with key "North;Manufacturing" would be sorted with the key "COMMENT;North;Manufacturing."

It is a further purpose of the current invention to provide drill-down from summary information to detail level information as wet as multidimensional access to information stored in a multidimensional database. To accomplish this, the key associated with each slice of specifies its position in a in drill-down hierarchy, for example the following keys are from documents used to store 3 levels of drill-down hierarchy.

World.
World;USA
World;USA;California

Drill-down functionality can be achieved by storing in each slice as, for example the row or column headings, the text which must be appended to the key value of the current slice to create the key value of the drill-down, or detail slice. This is demonstrated by the example documented by Appendix 2 (GLOBAL.SBA). The drill-down functionality is accomplished by taking the value of the row heading clicked on by the user, appending it to the key value of the current slice and retrieving the slice associated with the resulting key. As explained in Appendix 2, checks we made to ensure did drill-down only occurs when there is detail data for the row clicked on.

In a further extension of the current invention, drill-down can occur in two dimensions where both the value of the row and column heading of the current slice can be drilled-down upon.

In a further extension of the current invention, ad hoc query to choose a slice of a multidimensional database can be combined with drill-down by defining a key for slices which contains both drill-down information and other dimensions values. For example, the keys
Manufacturing;Worldwide:USA
and
Finance;Worldwide;USA;California
show that ad hoc query (to change Manufacturing to Finance) can be combined with drill-down to append the value California to the key Worldwide; USA. This extension is demonstrated the documentation in Appendix 2.

In a further extension of this invention, in addition to storing the table of numbers making up a 2 dimensional data slice in a single field, each of the numbers in the slice can be stored in separate fields.

In a further extension of this invention, the current invention can be used to store multidimensional data in a series of text files (one containing the key names of all slices and the names of files containing slice data) or with a text file for each slice and the files names replacing the key value. This extension is useful in that it allows the current invention to be used to store and retrieve data as HTML (text files) on the World-Wide-Web.

It is a further purpose of this invention to allow the replication of multidimensional databases which do not themselves support replication. That is to take modifications to daft in one database at one location and update another database which may be at a different location to reflect those changes.

This is using the current invention by methods including the following:

Method 1

Replication of Source Data Using Lotus Notes as Intermediary

1. By extracting a table of source data from Multidimensional database A at one location using appropriate function.
2. Placing this data into Lotus Notes in the form described above as slices of data with keys for each slice using the NotesKeyedUniqueInsert function.
3. Using Lotus Notes replication to transfer the data to another database.
4. Retrieving the data from Lotus Notes using The NotesKeyedSelect function and placing this data into the replica copy of the database at location B.

Similarly a table of modifications can be extracted from database B and transferred to database A. This accomplishes two way replication.

Method 2

Transfer of Log Files Specifying to Databases

1. A log storing all changes to each database is stored in Lotus Notes in textual format. (As it slice of data with key specifying the databases to which it belongs. The slice specifies all changes made as a list of individual changes).
2. Lotus Notes is used to replicate the log file of database A to database B and vice versa.
3. A program is executed on database A which reads the log file for database B and makes all of the updates to database A which have been made to database B. Similarly, the log file for database A is replicated to database B and the updates specified in the log file for database B are made to database A.
4. Comparison of the log files of database A and B is used to identify replication conflicts where the same number has been changed in both database A and database B, but to two different values. This exception is stored in a replication log to allow a program or operator to deal with the exception.

This scheme can be extended to allow replication between multiple databases by updating each database to reflect the log file changes of all the others.

One means of storing the log file is as follows (the line numbers are for clarity of explanation and are not to be a part of the log file:

1. Database=185710-47375-067393
2. NC='Sales','Budget','1996','USA'='3200'=067393
3. NC='Sales','Actual','1995','USA'='1200','2300'
4. DCA='Year'='1998'
5. DCD='Year'='1993'
6. DA='Customer'
7. End This change log file specifies changes as follows:

1. The log file is for database with unique identity: 185710-47375-067393
2. The number for Budget Sales in 1996 in the USA has changed from 3200 to 3800
3. The number for Actual Sales in 1995 in the USA has changed from 2100 to 2300
4. An element by the name of 1998 has been added to the Year dimension
5. The element by the name of 1993 has been deleted from the Year dimension.
6. A new dimension has been added called Customer.

The log file can also contain of insertions, deletions and changes to calculation formulae.

DESCRIPTION OF THE PREFERRED EMBODIMENTS

Referring to FIG. 1, the computer network of the invention comprises computers A,B,C each having a keyboard it or other data entry means and linked by communications links L1,L2,L3, at least some of which (e.g. L3 in this illustration) can be long distance links, e.g. via modem over telephone lines, or even satellite links for example. The computers can be linked to the World-Wide-Web.

Each computer comprises a microprocessor is arranged to run a replication multidimensional database program P (in this case an augmented version of Lotus Notes®, as described below) and having RAM, ROM and a hard drive HD on which the database D is stored.

The network supports a Lotus Notes ® database, for which the required software is loaded in each computer. The user of each computer (preferably an 80486 machine or better, running Windows®) can access and update the entire database. This involves changing a slice of a particular copy of the database. After a slice is saved and when the database is next replicated with a copy, changes an transferred to the replica copy, so that both copies now contain the same information. The database software is an augmented version of Lotus Notes ®. Before describing this process in more detail, the structure of the database will be described with reference to FIGS. 2 and 3.

Figure 2:
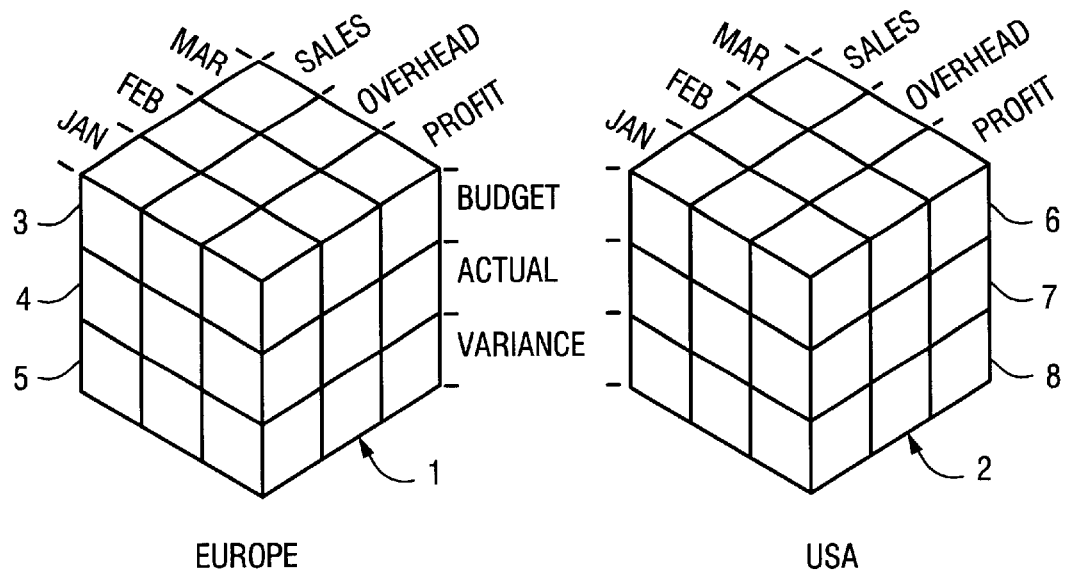
FIG. 2 is a diagrammatic representation of a multi-dimensional (N-dimensional) database utilised in the present invention.

Referring to FIG. 2. a four-dimensional database is illustrated as two three-dimension databases 1 and 2, relating to Europe and USA respectively, and each having month variables along one axis, sales, overhead and profit variables along another axis, and budget, actual and variance (=actual−budget) variables along the third axis. In this example than are $2 \times 3^3 = 54$ cells in total, although in practice the number of cells will be much greater. The small number of cells shown is purely for illustration, and does not affect the principle of operation. A copy of the above N-dimensional database (N=4) is stored on the hard disc of each computer it the network.

In Lotus Notes ® an ordered list of keys is stored, each key having a single component or relating to a dimension of The database and each key being associated with a single one-dimensional record. The resulting two dimensional data structure is essentially a 2-dimensional keyed indexed database. In accordance with the present invention, as illustrated in FIG. 2, each key has N-M components (i.e. 4−2=2 components in an case) and is associated with a particular M dimensional array or slice (preferably M=2), so that each key is associated with a two-dimensional data slice 3,4 or 5 of the "EUROPE" part of 6,7 or 8 of the in part of the database. Far example the key "USA;BUDGET" relates to the data slice 6 containing the sales, overhead and profit figures for January, February and March.

The keys are listed in e.g. alphabetical order so that any slice of the 4-dimensional database can be retrieved by finding its associated key.

When such a slice (e.g. slice 4) has been retrieved by a particular user and amended, this amended version of the slice is replicated over the network from the database to which the change was made to replica copies when replication takes place.

Figure 3:
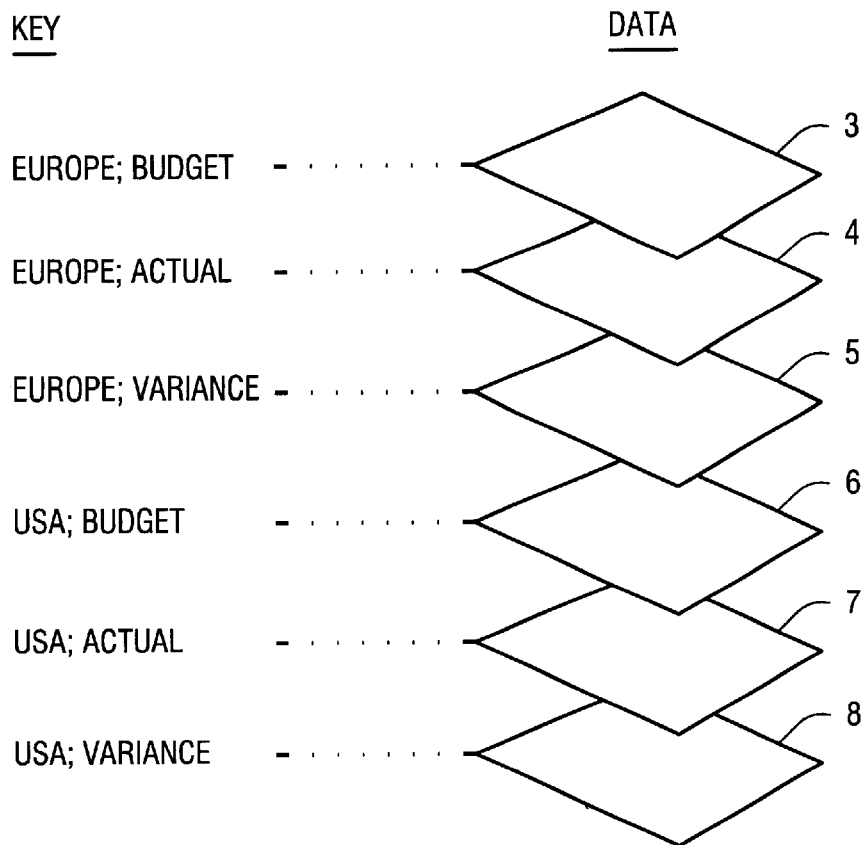
FIG. 3 is a diagrammatic representation of the M-dimensional (in this case 2-dimensional) slices and their associated keys utilised in the multi-dimensional database of FIG. 2.
Figures 4A, 4B:
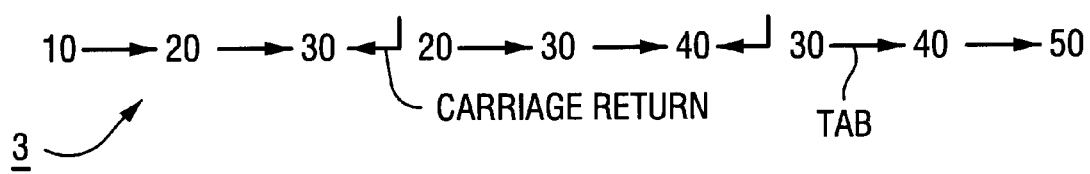
FIG. 4A is a representation of the daft format of slice 3 in FIG. 3.
FIG. 4B shows the corresponding two-dimensional data structure of slice 3.

Although FIG. 3 shows data slices 3 to 8 as being inherently two-dimensional it is important to note that in data slices are actually stored as strings, with the two-dimensional structure stored as control characters, eg. tab to separate adjacent data items in the same row has carriage return to separate adjacent rows. This is illustrated for slice 3 in FIG. 4A, which corresponds to the two-dimensional structure shown in FIG. 4B.

In principle a data structure of dimensionality greater than two could be defined by using more than two control characters.

Figure 5:
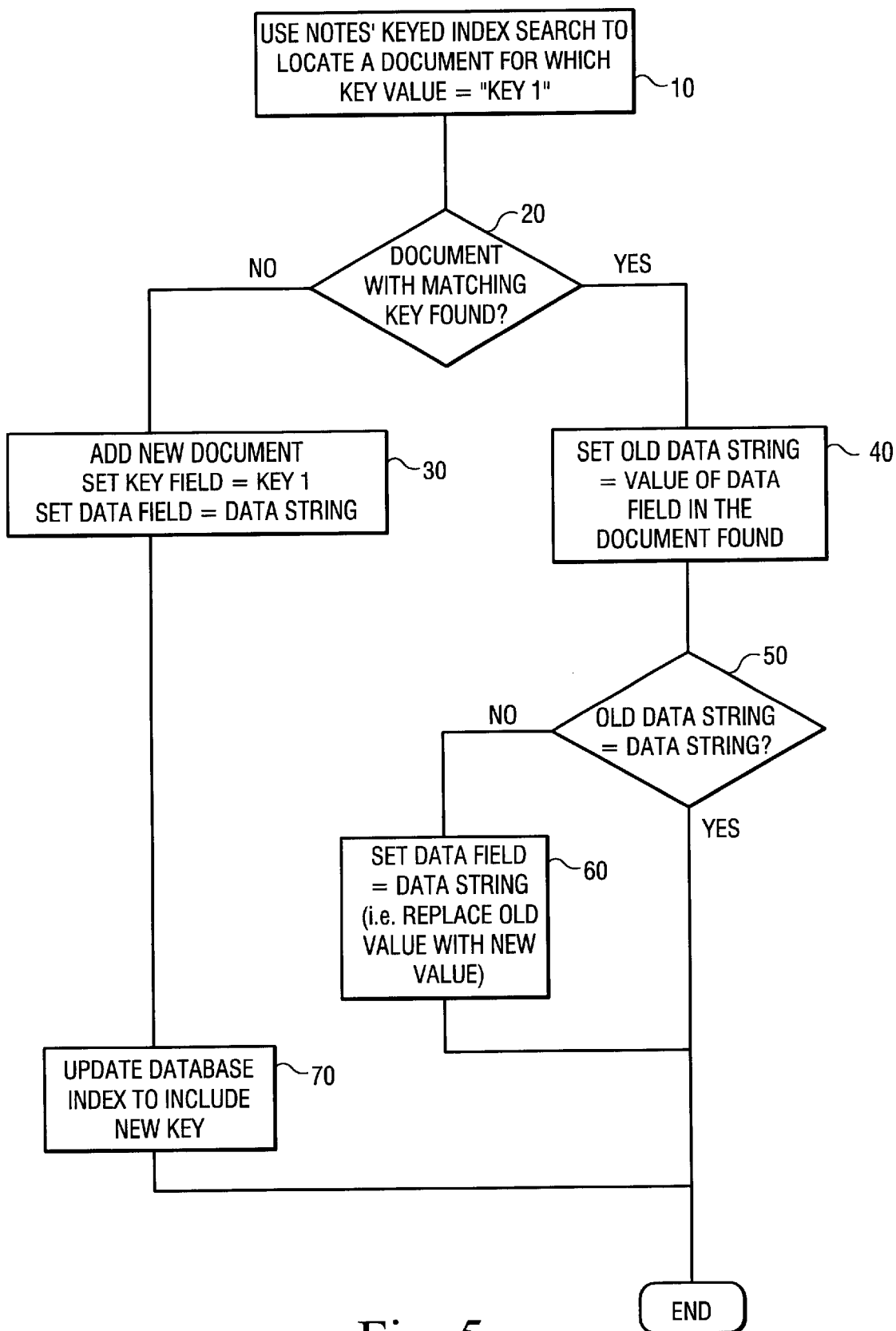
FIG. 5 is a flow diagram illustrating writing of a data slice in the multi-dimensional database.

The process of writing a data slice is illustrated in FIG. 5. "KEY1", the first key in the list, is entered (step 10) to see if a corresponding document (i.e. data slice) exists (step 20) and if such a document does exist commands 40 and 50 are entered has shown. If the old datastring (i.e. the data in the slice) does not equal the new datastring being entered as the new datastring (data slice) then the appropriate datafield command is entered (step 60).

If no document with a matching key is found in step 20, the key field is set to "Key 1" and the data field is set to "datrastring" (step 30) before updating the database (step 70).

Figure 6:
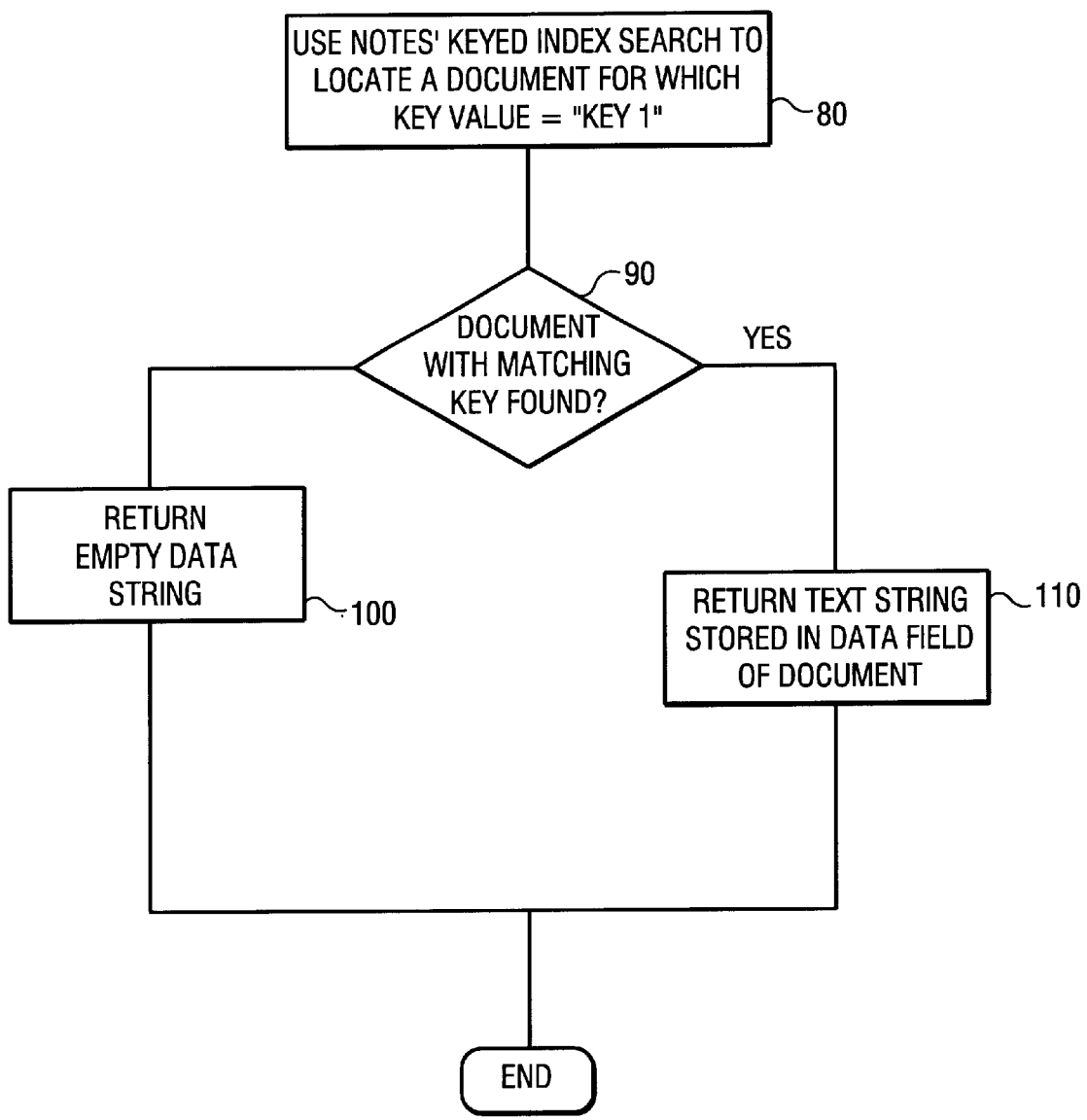
FIG. 6 is a flow diagram illustrating the reading of a data slice in the multi-dimensional database.

The reading process is shown in FIG. 6. The key for a given data slice is entered (step 80) and depending on whether or not a matching document (data slice) is found (step 90) an appropriate text string (eg. that shown above for slice) is returned (step 110) or an empty string is returned the (step 100).

Figure 7:
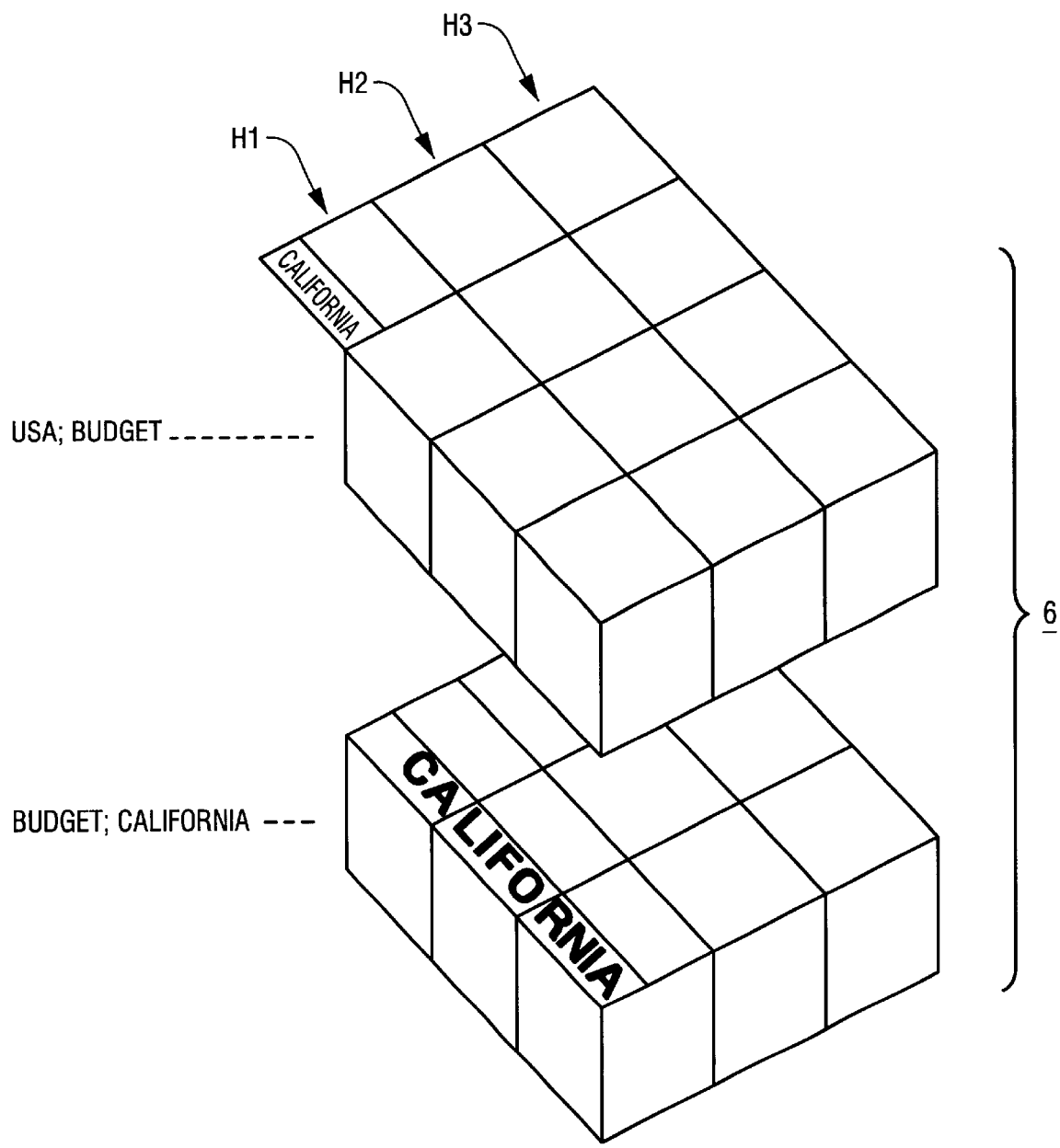
FIG. 7 is a diagrammatic representation of a two-dimensional data slice with a key for "drill down" to a deeper layer of the slice.

Referring to FIG. 7, a data slice 6 of database 2 (FIG. 2) is shown, comprising two layers. The upper layer is provided with row or column headings H1,H2 and H3 of which H1 contains text (in this case: CALIFORNIA) which must be appended to the key value USA;BUDGET to create the key value of the lower "drill-down" layer for California.

Replication

Two replica databases as shown in FIG. 8A (and stored e.g. on computers A and B respectively) are assumed to contain the same data. As shown in FIG. 8B, changes are made to each of the two replicas independently where * indicates changed document from DBA and ⊗ indicates changed document from DBB.

As shown in FIG. 8C, when the databases 'replicate' changes to 'DBA' are transferred to 'DBB' and vice versa. Where a document has been changed in 'DBA' and 'DBB', an exception condition (error) is logged for operator attention.

The result is that changes made to both database are replicated—transferred—to the other database. When each database contains documents which contain data slices and keys, the replication process can be used to facilitate replication of a multidimensional database.

What is claimed is:

1. A network of computers having:
   i) individual data entry means;
   ii) at least one communications link for transferring data entered from a said data entry means to other computers in the network;
   iii) a distributed N-dimensional database accessible and updateable by said computers, N being an integer greater than two, said N-dimensional database comprising:
      a) a plurality of M-dimensional arrays where M is an integer greater that one and less than N, and
      b) an ordered list of keys, each key being associated with a particular M-dimensional array and having a string of N minus M (N–M) components which identify the associated M-dimensional array, said string defining the order of the key in said list;
   iv) searching means for finding a desired M-dimensional array in response to entry of said key from a said data entry means;
   v) updating means for modifying a found M-dimensional array, and
   vi) replicating means for replicating modifications to said modified M-dimensional array over the network.

2. A network as in claim 1 wherein each said M-dimensional array comprises data separated by control characters for defining its M-dimensional structure.

3. A network as in claim 1 wherein M is 2.
4. A network as in claim 1 wherein
   at least one of said M-dimensional arrays has a hierarchical structure,
   rows and/or columns at one level in the hierarchy being divided into groups at an adjacent lower level in the hierarchy, and
   the levels in the hierarchy being selectable by individual users.
5. A network as in claim 4 wherein levels in said hierarchical structure below the top level are associated with extra components in the string of the key corresponding to the top level of the hierarchy.
6. A network as in claim 1 wherein said replicating means comprises program means for transmitting modifications to the distributed database over the network at predetermined intervals.
7. A network as in claim 6 wherein said program means further comprises override means for forcing a replication of modifications to the distributed database in response to entry of a command from a data entry means.
8. A network as in claim 1 comprising spreadsheet means for performing calculations on the data in said distributed database.
9. A network as in claim 1 wherein N is at least two greater than M, each string comprising at least two components.
10. A network as in claim 1 which is connected to the World Wide Web and wherein the data is stored and retrieved as HTML data.
11. A network of computer having:
    i) individual data entry means;
    ii) at least one communications link for transferring data entered from a said data entry means to other computers in the network;
    iii) a distributed N-dimensional database accessible and updateable by said computers, N being, an integer greater than two, said N-dimensional database comprising:
       a) a plurality of M-dimensional arrays where M is an integer greater than one and less than N, and
       b) an ordered list of keys, each key being associated with a particular M-dimensional array and having a string of N minus M (N–M) components which identify the associated M-dimensional array, said string defining the order of the key in said list;
    iv) searching means for finding a desired M-dimensional array in response to entry of said key from a said data entry means;
    v) updating means for modifying a found M-dimensional array, and
    vi) replicating means for replicating modifications to said modified M-dimensional array over the network;
    at least one of said M-dimensional arrays being associated with textual comments, and a further class of COMMENT keys being provided for sorting such textual comments.
12. A network as in claim 11 wherein the keys of said further class are identified by a prefix or suffix to said textual comments.
13. A method for updating a distributed N-dimensional database in a network of computers having at least one communications link for transferring data entered at one computer to other computers in the network, said method comprising:
    (i) organizing a distributed N-dimensional database, N being an integer greater than two, to include:

a) a plurality of M-dimensional arrays where in is an integer greater than one and less than N, and b) an ordered list of keys, each key being associated with a particular in M-dimensional array and having a string of N minus M (N–M) components which identify the associated M-dimensional array, said string defining the order of the key in said list;

(ii) searching for and finding a desired M-dimensional array in response to entry of a key at one of said computers; and (iii) modifying a found M-dimensional array and replicating such modification to said distributed array over the network.

14. A method as in claim 13 wherein each said M-dimensional array comprises data separated by control characters for defining its M-dimensional structure.

15. A method as in claim 13 wherein in is 2.

16. A method as in claim 13 wherein:

at least one of said M-dimensional arrays has a hierarchical structure, rows and/or columns at one level in the hierarchy being divided into groups at an adjacent lower level in the hierarchy, and the levels in the hierarchy being selectable by individual users.

17. A method as in claim 16 wherein levels in said hierarchical structure below the top level are associated with extra components in the string of the key corresponding to the top level of the hierarchy.

18. A method as in claim 13 wherein said replicating step comprises transmitting modifications to the distributed database over the network at predetermined intervals.

19. A method as in claim 18 further comprising forcing a replication of modifications to the distributed database in response to entry of a command from a computer.

20. A method as in claim 13 comprising performing calculations on the data in said distributed database.

21. A method as in claim 13 wherein N is at least two greater than M, each string comprising at least two components.

22. A method as in claim 13 which includes data communication over the World Wide Web and wherein the data is stored and retrieved as HTML data.

23. A method for updating a distributed N-dimensional database in a network of computers having at least one communications link for transferring data entered at one computer to other computers in the network, said method comprising:

(i) organizing a distributed N-dimensional database, N being an integer greater than two, to include:

a) a plurality of M-dimensional arrays where M is an integer greater than one and less than N, and b) an ordered list of keys, each key being associated with a particular M-dimensional array and having a string of N minus M (N–M) components which identify the associated M-dimensional array, said string defining the order of the key in said list;

(ii) searching for and finding a desired M-dimensional array in response to entry of a key at one of said computers; and (iii) modifying a found M-dimensional array and replicating such modification to said distributed in over the network;

at least one of said M-dimensional arrays being associated with textual comments, and a further class of COMMENT entries being provided for sorting such textual comments.

24. A method as in claim 23 wherein the entries of said further class are identified by a prefix or suffix to said textual comments.

* * * * *